(12) United States Patent
Kosaka et al.

(10) Patent No.: US 7,701,486 B2
(45) Date of Patent: Apr. 20, 2010

(54) IMAGE CAPTURING DEVICE

(75) Inventors: Akira Kosaka, Yao (JP); Junichi Tanii, Izumi (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 475 days.

(21) Appl. No.: 11/702,252

(22) Filed: Feb. 5, 2007

(65) Prior Publication Data
US 2007/0196087 A1 Aug. 23, 2007

(30) Foreign Application Priority Data
Feb. 9, 2006 (JP) .............................. 2006-032205

(51) Int. Cl.
*H04N 5/228* (2006.01)
(52) U.S. Cl. ................ 348/208.7; 348/208.99
(58) Field of Classification Search ........... 348/208.99, 348/208.1–208.11; 396/55
See application file for complete search history.

(56) References Cited
U.S. PATENT DOCUMENTS
6,985,177 B2 * 1/2006 Takahashi et al. ...... 348/208.99

| | | | |
|---|---|---|---|
| 7,477,291 B2 * | 1/2009 | Seo ........................... | 348/208.7 |
| 2003/0067544 A1 * | 4/2003 | Wada ....................... | 348/208.7 |
| 2006/0055787 A1 * | 3/2006 | Hirota et al. ............. | 348/208.5 |

FOREIGN PATENT DOCUMENTS
| JP | 2000-131610 A | 2/2000 |
| JP | 2003-110928 A | 4/2003 |
| JP | 2004-77711 A | 3/2004 |

* cited by examiner

*Primary Examiner*—Tuan Ho
*Assistant Examiner*—Don Nguyen
(74) *Attorney, Agent, or Firm*—Sidley Austin LLP

(57) ABSTRACT

An image capturing device, including an rectangular image capturing element having long sides and short sides; an image capturing optical system forming an image of a subject on the rectangular image capturing element; a first driving device which moves the rectangular image capturing element in a first direction slanted by a predetermined angle from the long side and the short side of an outer shape of the rectangular image capturing element in a plane perpendicular to an optical axis of the image capturing optical system; and a second driving device which moves the rectangular image capturing element in a second direction slanted by a predetermined angle from the long side and the short side of the outer shape of the rectangular image capturing element in the plane perpendicular to the optical axis of the image capturing optical system, but the second direction differs from the first direction.

9 Claims, 8 Drawing Sheets

Figure 5A:
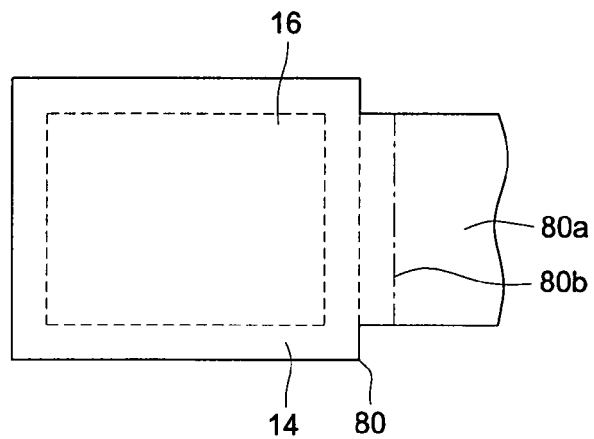

FIG. 1(a) PRESENT INVENTION
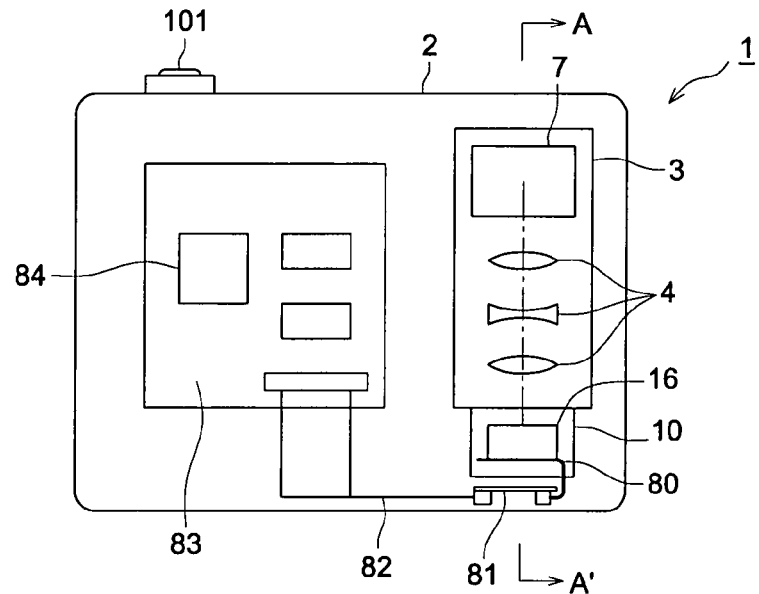
FIG. 1(b) PRESENT INVENTION
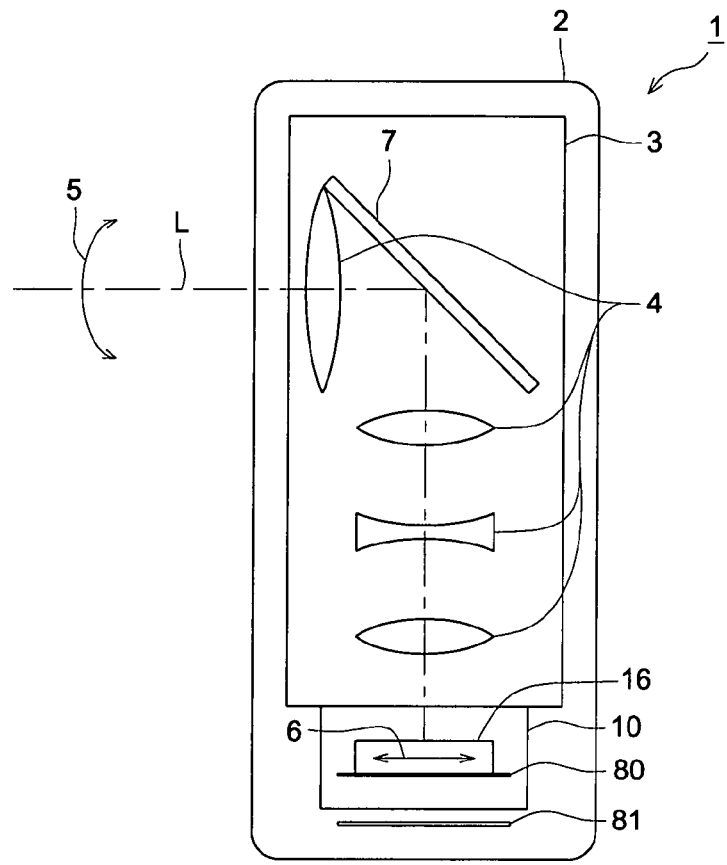

FIG. 2 ( a )    PRESENT INVENTION
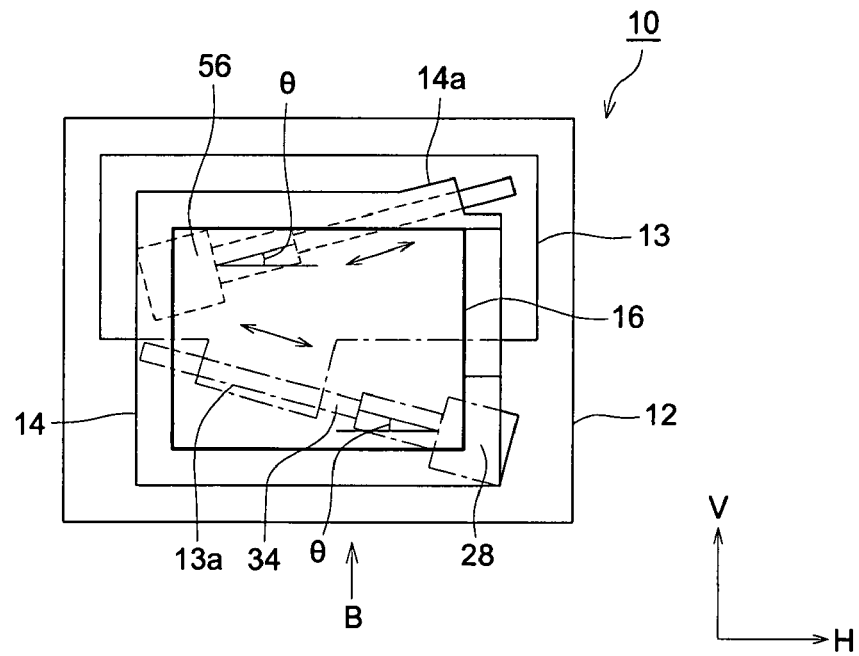
FIG. 2 ( b )    PRESENT INVENTION
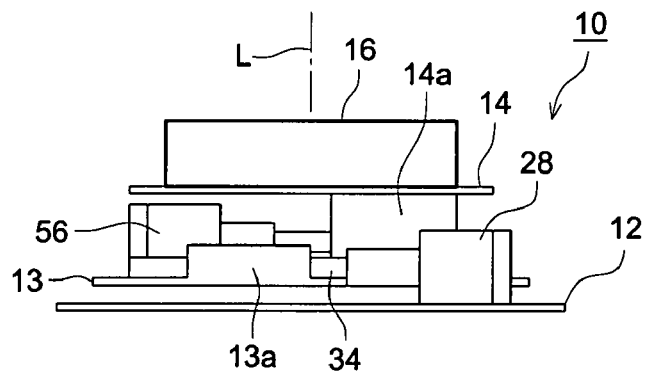
FIG. 2 ( c )    PRESENT INVENTION
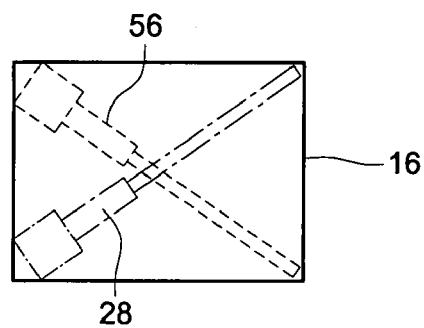

FIG. 3 (a) PRESENT INVENTION
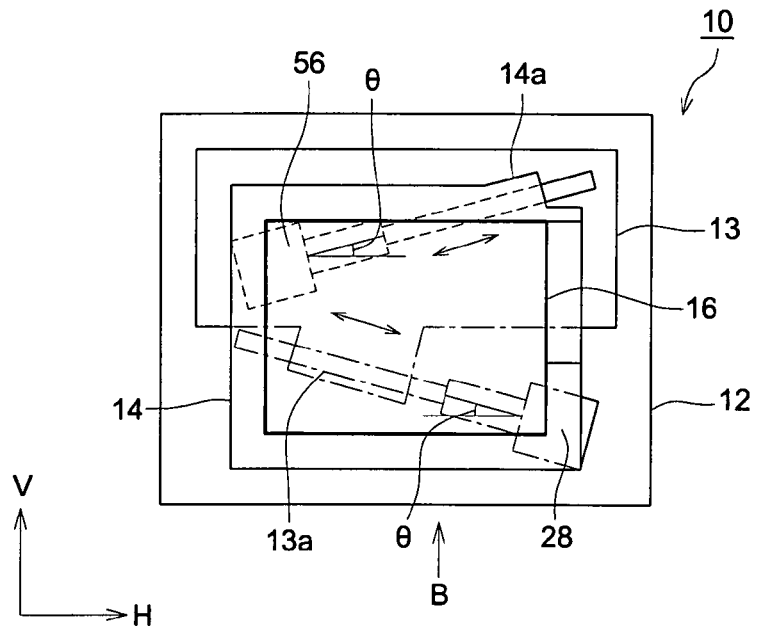
FIG. 3 (b) CONVENTIONAL ART
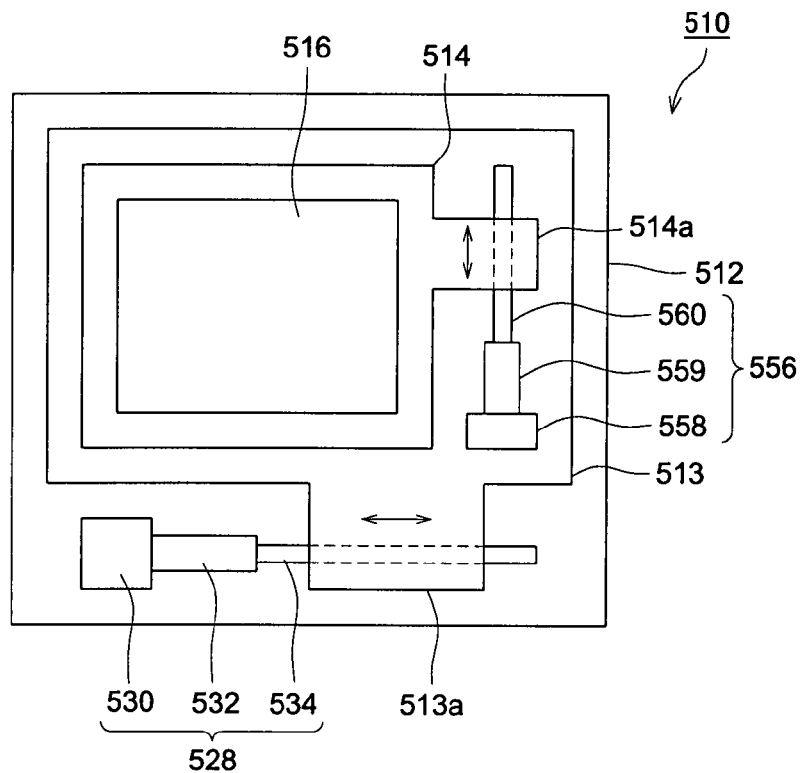

FIG. 4 (a)  PRESENT INVENTION
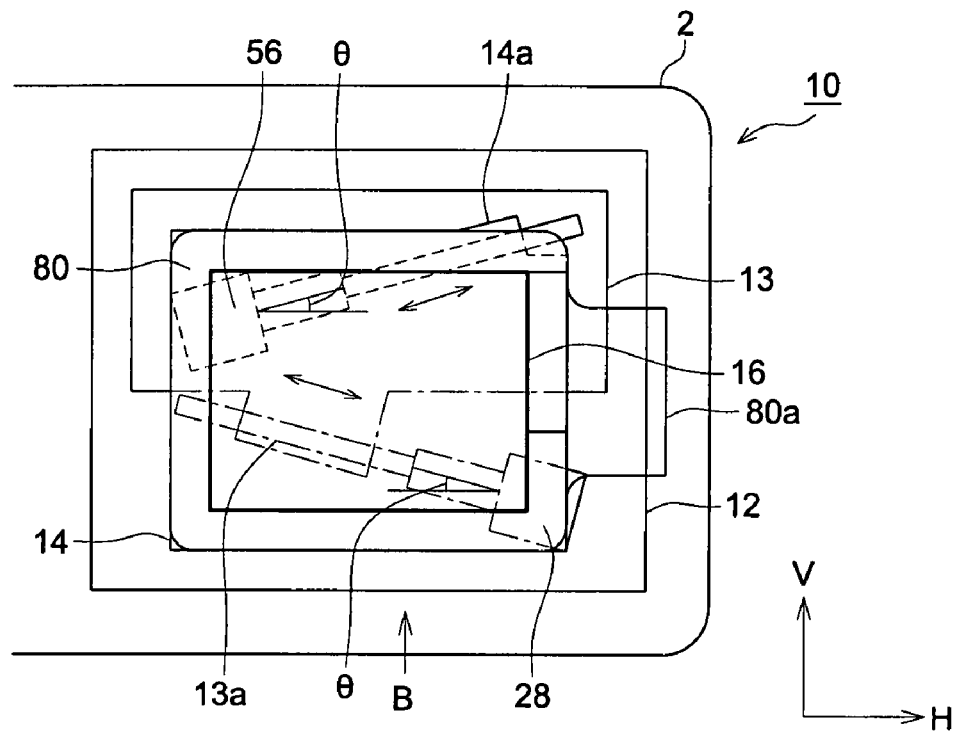
FIG. 4 (b)  PRESENT INVENTION
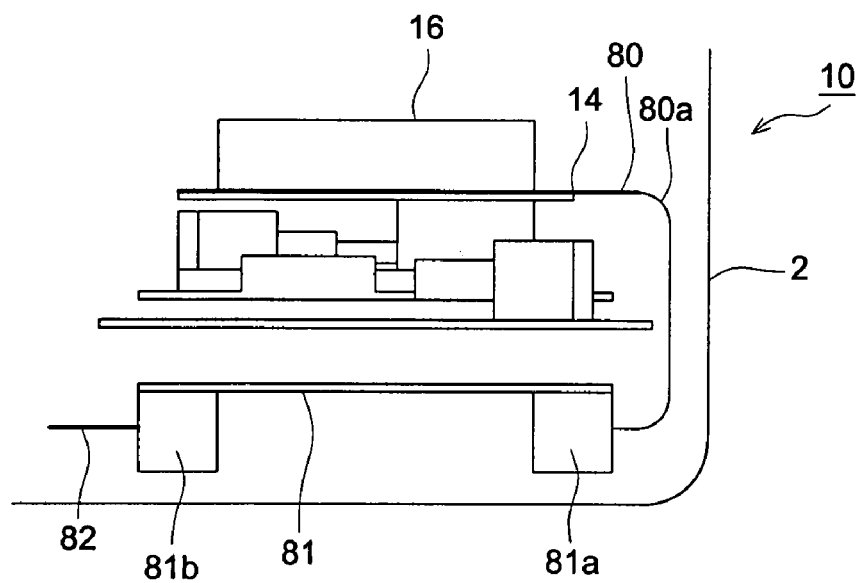

FIG. 6 (a) CONVENTIONAL ART
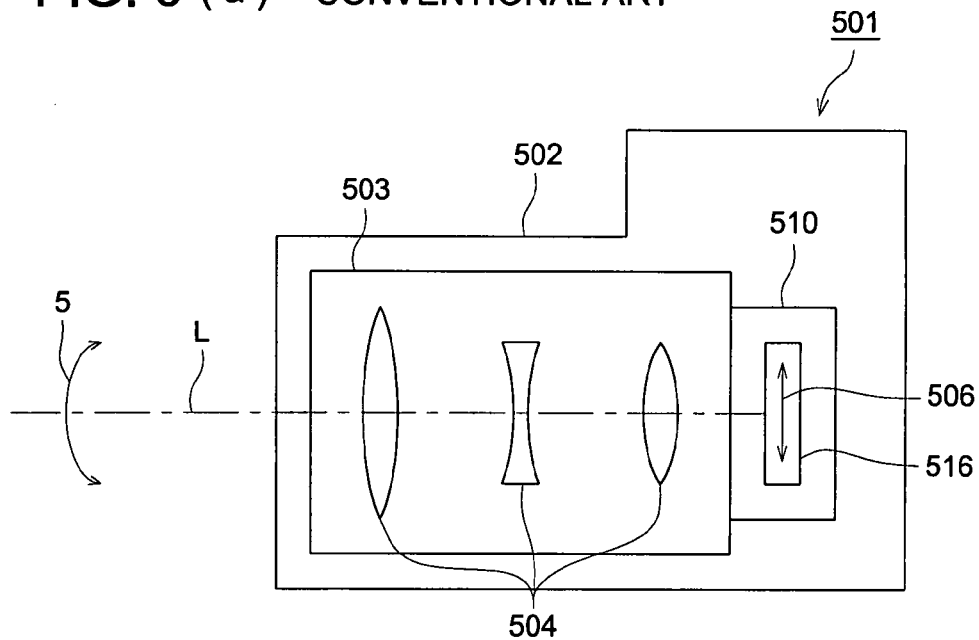
FIG. 6 (b) CONVENTIONAL ART
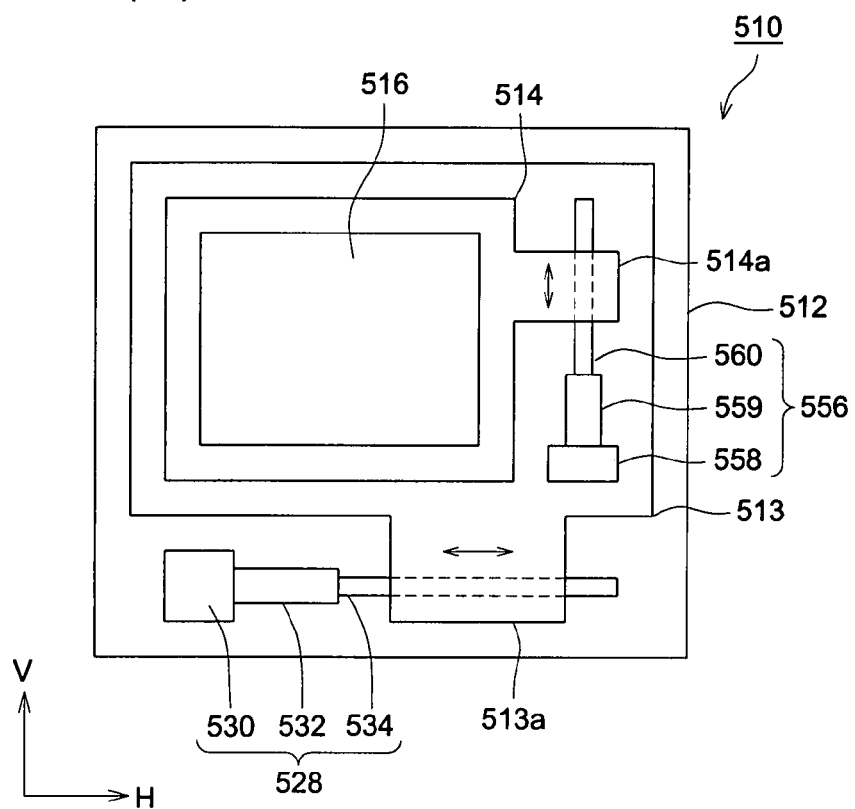

IMAGE CAPTURING DEVICE

This application is based on Japanese Patent Application No. 2006-032205 filed on Feb. 9, 2006, with the Japanese Patent Office, the entire content of which is hereby incorporated by reference.

TECHNICAL FIELD

The present invention relates to an image capturing device, and in particular, to an image capturing device including driving devices which can move an image capturing element in a plane which is perpendicular to the optical axis of the image capturing optical system.

BACKGROUND

In recent years, in the field of digital cameras, camera-shake compensating mechanisms are disclosed as an image capturing element moving method, in which an image capturing element is mounted in the lens barrel and moveable in two directions, and further the image capturing element is moved corresponding with the shake of the image capturing device (for example, see Patent Document 1). In the above conventional camera-shake compensating mechanisms in which the image capturing element is moved, a guide shaft to move the image capturing element, which is rectangular, is aligned along a direction (hereinafter referred to as direction "H") parallel to the long side of the image capturing element, and the other guide shaft is aligned along a direction (hereinafter referred to as direction "V") parallel to the short side of the image capturing element.

Because in order to make a thick digital camera, no space is available behind the image capturing element. That is, in the structure of the conventional camera-shake compensating mechanism, both a driving device (being a driving shaft and a driving element), and the image capturing element, are provided on a common plane with respect to the optical axial direction of the image capturing optical system, whereby the driving shafts are aligned in directions H and V, which effectively uses space within the digital camera.

Further, a method to improve the ability of the camera-shake compensating mechanism is disclosed (for example, see Patent Document 2), in which the camera-shake compensating means is installed 45 degrees declined against the vertical direction in the plane perpendicular to the optical axis so that the image capturing element can be moved farther in a specific direction. The method, described in Patent Document 2, moves the image capturing element in the direction perpendicular to the optical axis of the image capturing optical system, while directly using the camera-shake compensating means. Accordingly, in order to move the image capturing element in the direction perpendicular to the optical axis of the image capturing optical system, the camera-shake compensating means and the image capturing element must be arranged in the same plane.

Further, in order to design thin digital cameras, a bent optical system is also proposed in which the lenses do not project in front, even though a zooming operation is conducted, while the thickness of the camera does not change (for example see Patent Document 3).

[Patent Document 1] Unexamined Japanese Patent Application Publication No. 2003-110,928

[Patent Document 2] Unexamined Japanese Patent Application Publication No. 2004-77,711

[Patent Document 3] Unexamined Japanese Patent Application Publication No. 2000-131,610

However, in the case that the camera-shake compensating mechanism shown in Patent Document 1 is used on a thin bodied camera incorporating the light bent optical system shown in Patent Document 3, when the optical axis is bent at 90 degrees by the bent optical system toward the bottom side in the thin bodied camera, the image capturing element is to be mounted with its image capturing surface facing upward at the bottom of the thin bodied camera, and thereby, the spaces around the image capturing element, in particular, the space in direction V is very narrow, therefore, a guide shaft can not be assembled, even if the guide shaft is assembled in spite of this reason, the length of the guide shaft becomes so short that resonant frequency is reduced, and movement is too slow, or the movement is not stable, which results in problems.

Further, in the case of the camera-shake compensating means shown in Patent Document 2, space around the image capturing element is so small that the image capturing element and the camera-shake compensating means can not be assembled on a common surface, accordingly, the camera-shake compensating means of Patent Document 2 can not be applied to the thin bodied camera incorporating the light bent optical system shown in Patent Document 3.

Still further, in the thin bodied camera incorporating the light bent optical system, to arrange a flexible circuit board, through which electrical power and control signals are supplied to the image capturing element, while output signals from the image capturing element are sent to a CPU, the flexible circuit board may be bent at a sharp angle, because the space around the image capturing element is so narrow that the image capturing element may be driven by very large force due to the flexibility of the flexible circuit board (which is flexible but damage-resistant), which causes a major problem.

SUMMARY OF THE INVENTION

The present invention has been achieved in view of the above problems, and an object of the present invention is to provide an image capturing device incorporating a camera-shake compensating device which is small-sized but with high performance, and suitable for the light bent optical system.

The object of the present invention will be attained by the structures below.

Structure 1

In an image capturing device including an image capturing optical system and a rectangular image capturing element having long sides and short sides, the image capturing device is characterized in that driving devices (which are a first driving device and a second driving device) are provided to move the rectangular image capturing element, in a first direction, by the first driving device, which is inclined at a predetermined angle to a long and short sides of the rectangular outer shape of the image capturing element in a plane perpendicular to an optical axis of the image capturing optical system, and in a second direction, by the second driving device, which is inclined at a predetermined angle to the long and short sides of the rectangular outer shape of the image capturing element in the plane perpendicular to the optical axis of the image capturing optical system, wherein the second direction differs from the first direction.

Structure 2

The image capturing device described in Structure 1 is characterized in that the first direction is not orthogonal to the second direction.

Structure 3

The image capturing device described in Structure 1 or 2 is characterized in that both an angle between the first direction and the long side of the outer shape of the image capturing element and an angle between the second direction and the long side of the outer shape of the image capturing element are equal to or less than an angle between the long side of the outer shape of the image capturing element and a diagonal line of the outer shape of the rectangular image capturing element.

Structure 4

The image capturing device described in any one of Structures 1-3 is characterized in that the driving devices include a guide section which is structured of a driving shaft of an impact actuator or a stepping motor.

Structure 5

The image capturing device described in Structure 4 is characterized in that the guide section is provided on the rear surface of the image capturing element.

Structure 6

In an image capturing device, including a rectangular image capturing element, an image capturing optical system, and a flexible circuit board which is connected to the image capturing element, and pulled out in a predetermined extension direction, and transmits electrical signals generated by the image capturing element, the image capturing device is characterized in that driving devices (which are a first driving device and a second driving device) are provided to move the image capturing element in a first direction by the first driving device and a second direction by the second driving device, both of which differ from the predetermined extension direction of the flexible circuit board.

Structure 7

The image capturing device described in Structure 6 is characterized in that the first direction is not orthogonal to the second direction.

Structure 8

The image capturing device described in Structure 6 or 7 is characterized in that both an angle between the first direction and the long side of the outer shape of the image capturing element and an angle between the second direction and the long side of the outer shape of the image capturing element are equal to or less than an angle between the long side of the outer shape of the rectangular image capturing element and a diagonal line of the outer shape of the rectangular image capturing element.

Structure 9

The image capturing device described in any one of Structures 6-8 is characterized in that the driving devices include a guide section which is structured of a driving shaft of an impact actuator or a stepping motor.

Structure 10

The image capturing device described in any one of Structure 9 is characterized in that the guide section is provided on the rear surface of the image capturing element.

Structure 11

The image capturing device in Structure 1, wherein when a camera shake is to be compensated, the rectangular image capturing element is moved by the first and second devices in a plane perpendicular to an optical axis of the image capturing optical system.

Based on the present invention, employed is the driving devices which can move the image capturing element in two directions, one of which, namely the first direction is inclined to both the long and short sides of the outer space of the image capturing element, and the other, namely the second direction differs from the first direction. Accordingly, the camera-shake compensating device can be downsized, because the available space is more effectively used, and further, the camera-shake compensation becomes stabilized and functions at a higher speed, due to increased driving force. Thus, the image capturing device, incorporating the camera-shake compensating device being very suitable for the bent optical system, can be offered.

BRIEF DESCRIPTIONS OF THE DRAWINGS

FIGS. 1(a) and 1(b) are schematic views of a digital camera as an example of the image capturing device of the present invention.

FIGS. 2(a), 2(b) and 2(c) are schematic views showing an example of the structure of the camera-shake compensating device of the present invention.

FIGS. 3(a) and 3(b) are schematic views showing the advantage of the camera-shake compensating device of the present invention compared with a conventional camera-shake compensating device.

FIGS. 4(a) and 4(b) are views in which a circuit board is added on FIG. 2(b).

Figure 5B:
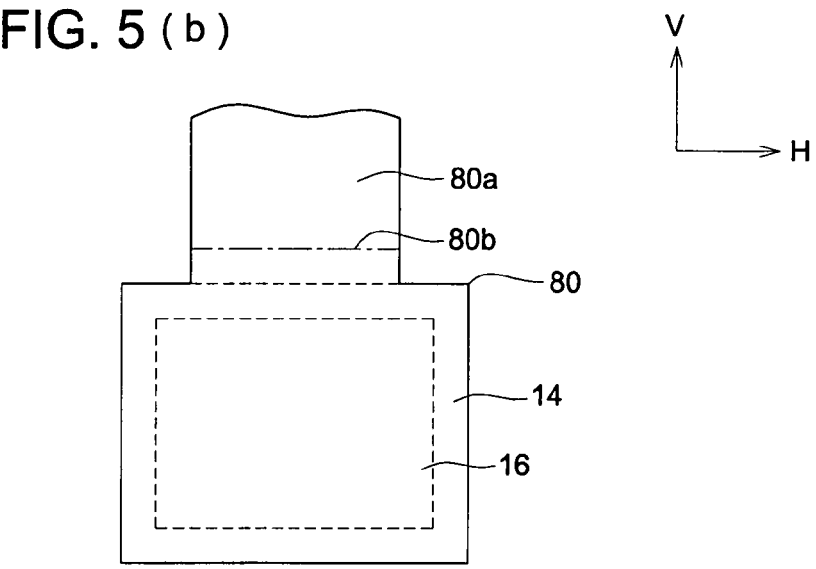
Figure 5C:
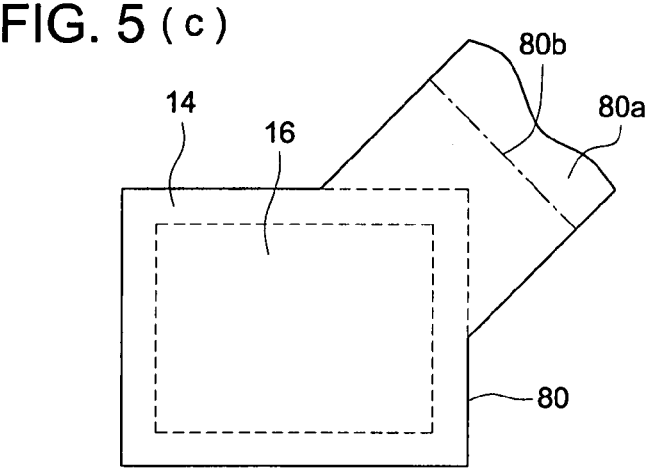

FIGS. 5(a), 5(b) and 5(c) are schematic views showing examples of pull-out directions and bending shapes of the flexible circuit board.

FIGS. 6(a) and 6(b) are schematic views showing examples of the structure of the conventional camera-shake compensating device.

FIGS. 7(a), 7(b), 7(c), 7(d) and 7(e) are schematic views explaining the driving principle of a linear actuator employing a piezo element.

Figure 8:
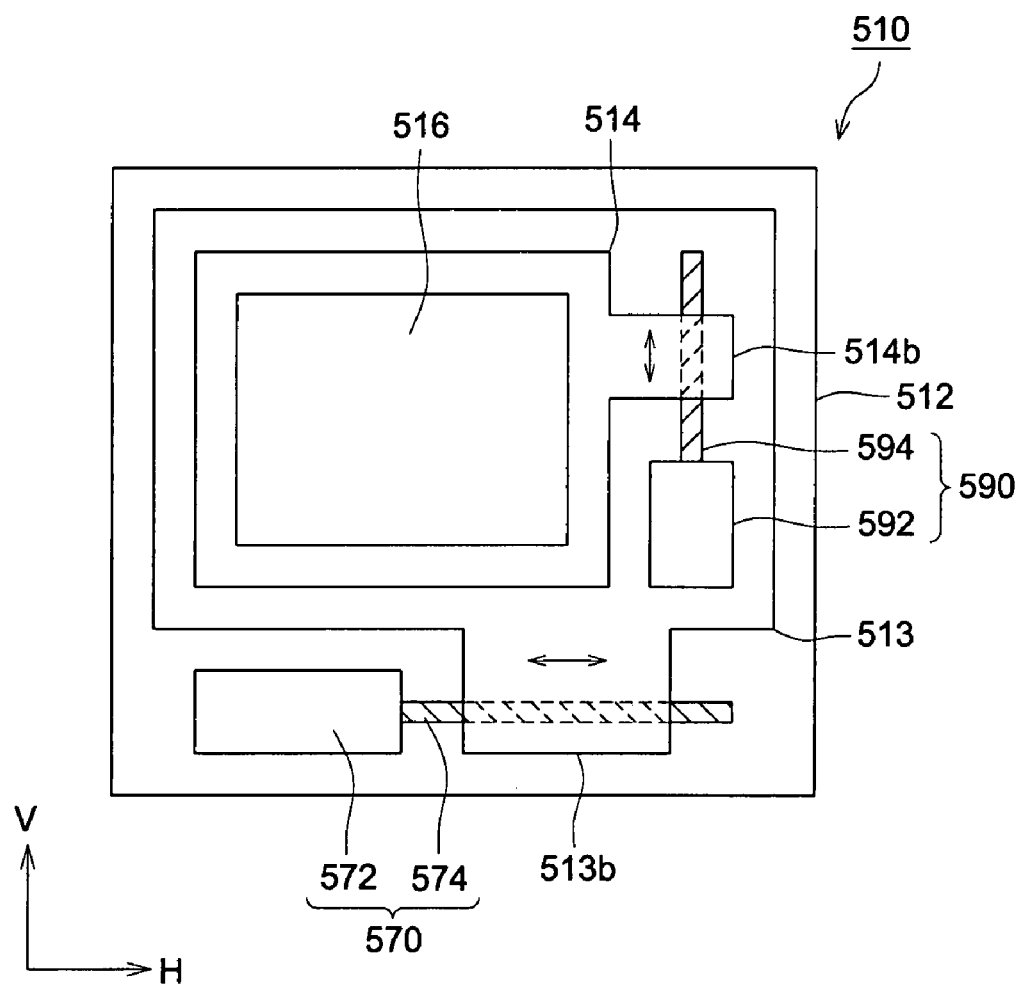

FIG. 8 is a schematic view showing an example of the camera-shake compensating device employing a linear actuator driven by a stepping motor.

DESCRIPTION OF THE PREFERRED EMBODIMENTS

The embodiments of the present invention will now be detailed, while referring to the drawings.

Firstly, the structure of a conventional camera-shake compensating device will be detailed, while referring to FIG. 6, which shows the structure of the conventional camera-shake compensating device. FIG. 6(a) is a cross sectional side view of digital camera 501 incorporating conventional camera-shake compensating device 510, while FIG. 6(b) shows the structure of conventional camera-shake compensating device 510, viewed along optical axis L.

In FIG. 6(a), digital camera 501 is structured of camera main body 502, and lens barrel 503 structured of an image capturing optical system including lenses 504. Camera-shake compensating device 510 is mounted at the image forming side of lens barrel 503, and image capturing element 516, such as a CCD, is provided within camera-shake compensating device 510. As shown by arrows 5 in FIG. 6(a), if digital camera 510 is shaken during image capture, and causes image capturing optical axis L entering lens barrel 503 to be misaligned, camera-shake compensating device 510 shifts image capturing element 516 as shown by arrow 506 so that the misalignment of image capturing optical axis L is compensated for.

In FIG. 6(b), "H" represents the horizontal axis, while "V" represents the vertical axis. Camera-shake compensating device 510 is structured of base 512, H-slider 513, V-slider 514, H-linear actuator 528 and V-linear actuator 556. H-linear actuator 528 is mounted on base 512 parallel to H-direction of image capturing element 516, and spindle 530 of H-linear-actuator 528 is adhered to base 512. V-linear actuator 556 is mounted on H-slider 513 parallel to V-direction of image capturing element 516, and spindle 558 of V-linear actuator 556 is adhered to H-slider 513.

H-slider 513 engages drive shaft 534 of H-linear actuator 528, at engaging section 513a, and can slide in direction H due to vibration of piezo element 532 of H-linear actuator 528. V-slider 514 is frictionally engaged with drive shaft 560 of V-linear actuator 556, at engaging section 514a, and can slide in direction V due to the vibration of piezo element 559 of V-linear actuator 556. Image capturing element 516 is mounted on V-slider 514.

For example, in order to shift image capturing element 516 by length "a" in "direction +V", V-linear actuator 556 is activated to shift V-slider 514 by length "a" in "direction +V" against H-slider 513, while in order to shift image capturing element 516 by length "b" in "direction +H", H-linear actuator 528 is activated to shift H-slider 513 by length "b" in "direction +H" against base 512.

In the above engaging mechanism having a guide section incorporating a drive shaft and an engaging section, in order to smoothly shift the slider with less back-lash, it is a well known means to lengthen engaging section 513 between the drive shaft and the slider. Specifically in such a camera-shake compensating device, vibration amplitude and phase-delay of frequency vibration up to 10 Hz must be controlled, accordingly, it is essential to lengthen the engaging section.

If the engaging length is short, the mechanical resonance point becomes lower so that the high frequency vibration can not be controlled. Further, in the case of a low mechanical resonance point, the vibration is not controlled by neither an electrical nor a mechanical filter, which results in unstable servo performance for following up the camera-shake. To overcome such unstable servo performance, the follow up performance must be lowered, then however, the camera-shake of up to 10 Hz, as well as that of very low frequencies, is not compensated for. As a result, the camera-shake generated by the vibration including low frequencies to high frequency up to 10 Hz, can not be controlled.

Accordingly, the performance of the above exemplified conventional camera-shake compensating device depends upon the engaging length of engaging section 514a, in which V slider 514, structured on H-slider 513, and V-linear actuator 556 engage. This problem will be explained in detail in FIG. 3.

Now, the driving principle of a linear actuator employing a piezo element, generally called an impact actuator, will be briefly explained while referring to FIG. 7, which is a schematic view to explain the driving principle of the impact actuator. FIG. 7(a) shows the wave forms of the driving voltage applied onto the piezo element, while FIGS. 7(b)-7(d) show the operation of the impact actuator. H-linear actuator 528 is shown also in FIG. 6(b). The same numbers apply to sections in FIG. 7 which are the same as those in FIG. 6.

Figure 7A:
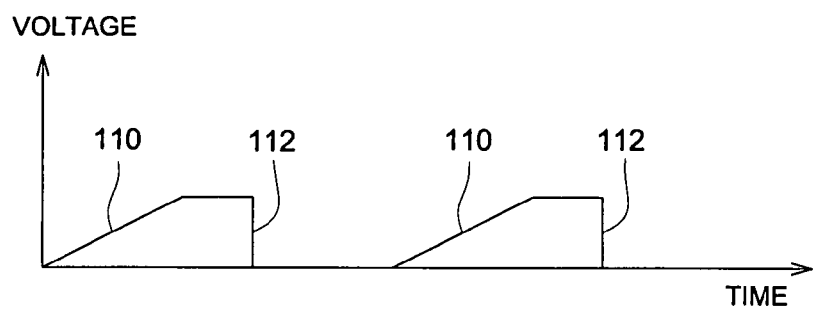
Figure 7B:
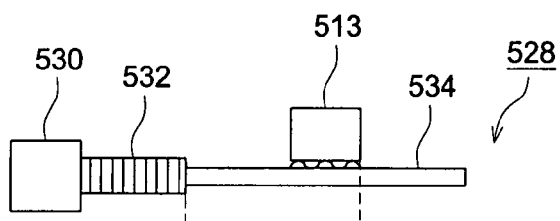
Figure 7C:
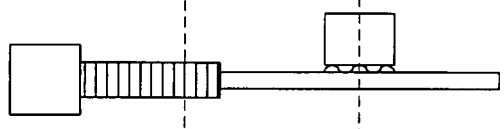

Driving voltages shown in FIG. 7(a) are applied to piezo element 532 of H-linear actuator 528 by a drive circuit, which is not illustrated. The driving wave forms are saw-tooth wave pulses, which include gradual rising sections 110 and sharp falling sections 112, and their frequencies are preferably 70% of the resonance frequency of H-linear actuator 528. Firstly, in the initial condition shown in FIG. 7(b), when gradual rising section 110 of the driving pulse is applied to piezo element 532, piezo element 532 gradually expands toward the right in the figure, whereby driving shaft 534, which is mounted on piezo element 532, also gradually shifts in its axial direction. Further, H-slider 513, which is frictionally engaged with driving shaft 534, is shifted with driving shaft 534 by friction, as shown in FIG. 7(c).

Figure 7D:
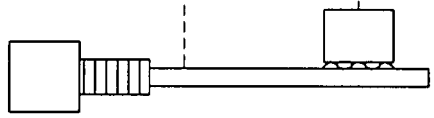
Figure 7E:
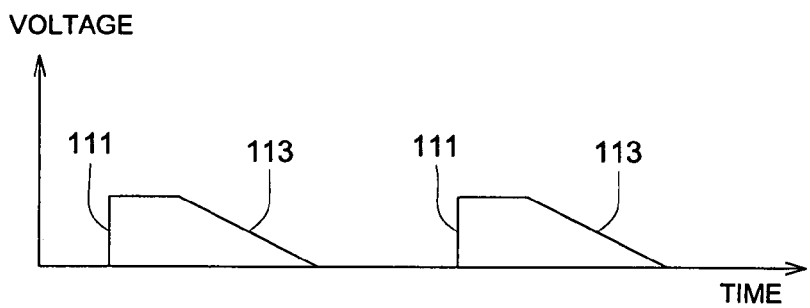

Next, when rapid falling section 112 of the driving pulse is applied to piezo element 532, piezo element 532 shrinks rapidly toward the left in the figure, whereby driving shaft 534, which is mounted on piezo element 532, also rapidly shifts in its axial direction. However, H-slider 513, which is frictionally engaged with driving shaft 534, stays practically at its original position and does not shift, because the inertia force is stronger than the frictional engagement force, as shown in FIG. 7(d). As a result, H-slider 513 shifts on driving shaft 534 toward the right from the initial position in FIG. 7(b). Accordingly, when the driving pulses, being the saw-tooth waves shown in FIG. 7(a), are applied continuously to piezo element 532, H-slider 513 can be continuously shifted toward the right.

In addition, when piezo element 532 expands or shrinks, H-slider 513 shifts while sliding on driving shaft 534. Therefore, in the above description "stays practically at its original position and does not shift" includes a case in which H-slider 513 entirely moves in any direction, because slider 513 largely shifts due to a gradual shift, while slightly shifts due to a rapid shift, whereby the amount of shift is not the same in both cases.

Still further, in order to shift H-slider toward the left in the figure, the driving pulse in which the wave form is opposite to the wave form in FIG. 7(a), having a rapid rising section 111 and a gradual falling section 113, is applied to piezo element 532, whereby H-slider can be shifted left by the opposite function to the case of a right shift. Additionally, the driving pulse can be a rectangle wave or any other appropriate form.

As a driving source of the linear actuator, not only the piezo element in FIG. 7 but also a stepping motor can be employed, which is explained while referring to FIG. 8, which is a schematic view showing an example of the camera-shake compensating device employing a linear actuator driven by a stepping motor. The same numbers apply to sections in FIG. 8 which are the same as those in FIG. 6.

In FIG. 8, H-linear actuator 570 is structured of the driving shaft of stepping motor 572, and the driving shaft has external lead screw thread 574. V-linear actuator 590 is also structured of the driving shaft of stepping motor 592, and this driving shaft also has external lead screw thread 594. To activate H-linear actuator 570 (or V-linear actuator 590), appropriate driving pulses are applied to stepping motor 572 (592), which rotate lead screw 574 (594). Since H-slider 513 (V-slider 514) has engaging section 513b (514b) having an internal screw thread to engage the external screw thread of lead screw 574 (594), H-slider 513 (V-slider 514) shifts in H-direction (V-direction) due to the rotation of lead screw 574 (594).

In a screw advancement method using a stepping motor and a lead screw, allowance (being back-lash) is necessary either inside the stepping motor or at the engaging section of the lead screw and the slider. For starting, or for changing the driving direction, an operation to cancel any back-lash in the driving direction is necessary.

Next, an example of the image capturing device of the present invention will be detailed while referring to FIG. 1. FIGS. 1(a) and 1(b) are the schematic views of a digital camera 1 as an example of the image capturing device of the present invention. FIG. 1(a) is a vertical sectional front view, while FIG. 1(b) is a horizontal sectional side view taken along line A-A' of FIG. 1(a).

In FIG. 1(a), digital camera 1 is structured of camera main body 2, lens barrel 3 including an optical system of lenses 4 and mirror 7, and camera circuit board 83. Camera-shake compensating device 10, including image capturing element 16 such as a CCD, is mounted at the end of lens barrel 3. Image capturing element 16 is mounted on flexible circuit board 80 which is connected to camera circuit board 83 through image capturing board 81 and connection flexible board 82 mounted on camera main body 2. ASIC (being Application Specific Integrated Circuits) 84 to perform operation control, image capturing control and image processing of digital camera 1, and a memory device are mounted on camera circuit board 83. Operational members, such as release button 101, are mounted at the top of camera main body 2.

In FIG. 1(b), in a bent optical system structured of lenses 4 and mirror 7, image capturing optical axis L is bent 90 degrees by mirror 7, and image capturing element 16 is mounted at the bottom of camera main body 2, with its image capturing surface faced upward. As shown by arrows 5 in FIG. 1(b), if digital camera 1 moves during image capture and image capturing optical axis L also moves, camera-shake compensating device 10 allows image capturing element 16 to shift as shown by arrows 6, and the misalignment of image capturing optical axis L is compensated for.

The structure of camera-shake compensating device 10 of the present invention will now be detailed while referring to FIG. 2, which is a schematic view showing an example of the structure of camera-shake compensating device 10 of the present invention. FIG. 2(a) is a top view, viewed from the image capturing optical axis L side, as a first example. FIG. 2(b) is a side view, viewed from side B in FIG. 2(a). FIG. 2(c) is a top view of relevant parts, viewed from an image capturing optical axis side L, as a second example. The same designation numbers are applied to the parts and sections in FIGS. 2(a) and 2(b) which are the same as the parts and sections in FIGS. 1(a) and 1(b). Here, camera-shake compensating device 10 functions as a moving mechanism in the present invention.

In FIG. 2(a), the first embodiment of camera-shake compensating device 10 is structured of base 12, first slider 13, second slider 14, first linear actuator 28 as the first driving device and second linear actuator 56 as the second driving device, wherein first linear actuator 28 is mounted on base 12, while declining at angle θ from the H direction of image capturing element 16 (being the first direction), and spindle 30 of first linear actuator 28 is adhered to base 12. Second linear actuator 56 is mounted on first slider 13 while declining at angle θ from the H direction of image capturing element 16, wherein angle θ is measured in the opposite direction to the case of first linear actuator 28, (being the second direction), and spindle 58 of second linear actuator 56 is adhered to first slider 13. In this case, the impact actuator shown in FIG. 7 is used as an example of the linear actuator, however, the other actuators, such as a linear actuator using the stepping motor may also be used, as shown in FIG. 8.

In FIG. 2(a), driving shaft 34 of first linear actuator 28 is engaged with first slider 13 at engaging section 13a, being movable in the axial direction of driving shaft 34. Driving shaft 60 of second linear actuator 56 is engaged with second slider 14 at engaging section 14a, being movable in the axial direction of driving shaft 60. Image capturing element 16 is fixed on second slider 14. Accordingly, camera-shake compensating device 10 is arranged on the reverse side of image capturing element 16.

More specifically, in order to shift image capturing element 16 by length "a", in direction (+V), first slider 13 is controlled to shift against base 12 by first linear actuator 28 by length of [(a/2)/sin θ], in directions (+V and −H), while second slider 14 is controlled to shift against first slider 13 by second linear actuator 56 by length of [(a/2)/sin θ], in directions (+V and +H).

Further, in order to shift image capturing element 16 by length "b", in direction (+H), first slider 13 is controlled to shift against base 12 by first linear actuator 28 by length of [(b/2)/cos θ], in directions (−V and +H), while second slider 14 is controlled to shift against first slider 13 by second linear actuator 56 by length of [(b/2)/cos θ], in directions (+V and +H).

In the above case, first linear actuator 28 and second linear actuator 56 are arranged being declined by angle θ, being the same angle but in opposite directions compared to direction H of image capturing element 16. However, the invention is not limited to this, but different angles may be used, if the angles are predetermined.

In FIG. 2(b), in order not to cross both the first direction for placing first linear actuator 28 as the first driving device and the second direction for placing second linear actuator 56 as the second driving device, within the scope of the form of image capturing element 16, first linear actuator 28 and second linear actuator 56 are placed on the reverse of image capturing element 16. That is, first linear actuator 28 and second linear actuator 56 are mounted on one plane which is nearly parallel to the image capturing surface of image capturing element 16 on the reverse of image capturing element 16. Accordingly the occupying volume of camera-shake compensating device 10 of the present invention can be minimized on the reverse of image capturing element 16.

FIG. 2(c) shows the second embodiment of camera-shake compensating device 10, being different from FIG. 2(a) and FIG. 2(b). That is, first linear actuator 28 as the first driving device and second linear actuator 56 as the second driving device are overlapped in optical axial direction L, and mounted along the distinct diagonal lines of image capturing element 16. Therefore, when the linear actuators are mounted on the reverse of image capturing element 16, the length of the actuator can be maximized. In addition, the technology of the slider and the engaging section in the second embodiment is the same as that in the first embodiment.

Next, the advantage of the camera-shake compensating device of the present invention will be detailed by comparison with the conventional one, while referring to FIG. 3, which are schematic views showing the advantage of the camera-shake compensating device compared with the conventional camera-shake compensating device. FIG. 3(a) is identical to FIG. 2(a), while FIG. 3(b) is identical to FIG. 6(b). FIG. 3(a) shows the camera-shake compensating device of the present invention, while FIG. 3(b) shows a conventional camera-shake compensating device.

As is quite obvious by comparing FIG. 3(a) and FIG. 3(b), camera-shake compensating device 10 of the present invention is mounted on the reverse side of image capturing element 16. Accordingly, the volume of camera-shake compensating device 10 can be extremely downsized compared to camera-shake compensating device 510 of the conventional art which is mounted on the same plane as image capturing element 516. Specifically, since the V-directional size is to be extremely reduced in a thin bodied camera incorporating the bent optical system, the present invention can contribute to the reduction of thickness of the cameras. Further, by the second embodiment of camera-shake compensating device 10 of the present invention in FIG. 2(c), the adequately large linear actuators can be mounted on a plane which is nearly the same as the surface area of the image capturing element, which further contributes the reduction of the thickness of the cameras.

As described in the explanation of FIG. 6(b), it is very important to make an engaging length sufficiently long between the slider and the linear actuator for the supporting structure incorporating the drive shaft and the engaging section as in the present embodiment. Accordingly, in the first embodiment of camera-shake compensating device 10 of the present invention shown in FIG. 3(a), the engaging length between first slider 13 and first linear actuator 28 and the engaging length between second slider 14 and first linear actuator 28 are nearly equal to the engaging length between H-slider 513 and H-linear actuator 528 in conventional camera-shake compensating device 510, but are far longer than the engaging length between V-slider 514 and V-linear actuator 556 in conventional camera-shake compensating device 510. That is, it is understood that camera-shake compensating device 10 of the present invention has nearly equal performance in the H-direction and extraordinarily good performance in the V-direction, comparing to conventional camera-shake compensating device 510.

Further, in conventional camera-shake compensating device 510, since the driving directions of the linear actuators are the same in the H-direction and V-direction of the image capturing element, when conventional camera-shake compensating device 510 is activated in H-direction or V-direction, any one of the linear actuator is required to compensate the camera shake. However, since camera-shake compensating device 10 of the present invention is activated by combined driving force generated by two linear actuators, the driving force of each linear actuator can be reduced, which is beneficial.

Still further, it is very infrequent that the direction of gravity is nearly equal to H-direction or V-direction of the image capturing element of digital camera 1, based on the photographer's camera aiming style. In conventional camera-shake compensating device 510, since the driving direction of the linear actuator is equal to H-direction or V-direction of the image capturing element, the linear actuator, which is directed in the direction of gravity, must drive the total weight of the camera-shake compensating device. However, in camera-shake compensating device 10 of the present invention, the driving force needs only to drive the component of the gravity along the axial driving direction of the linear actuator. Still further, since added driving force of two linear actuators are both used simultaneously to drive the camera-shake compensating device 10, the driving force for each linear actuator can be reduced. Still further, it is very infrequent that the direction of gravity is equal to the driving direction when the digital camera is generally used, and since the driving direction of the linear actuator is inclined to the side of the image capturing element in the present invention, the effect described above is mostly obtained when the digital camera is used in the various aiming styles.

Still further, in conventional camera-shake compensating device 510, since the driving direction of the linear actuator is horizontal or vertical to the direction of gravity, the image capturing element becomes unstable, depending upon its structure, due to the back-lash of the engaging section between the linear actuator and the slider. However, in the present invention, the back-lash is shifted by the weight of camera-shake compensating device 10 itself, whereby, no back-lash is generated on the engaging section between the linear actuator and the slider, which does not have an adverse effect on the performance of the camera-shake compensating device.

The relationship between the camera-shake compensating device 10 of the present invention and flexible circuit board 80 for wiring to the image capturing elements will be detailed while referring to FIG. 4. FIGS. 4(a) and 4(b) are drawings in which flexible circuit board 80 is added to the drawings in FIGS. 2(a) and 2(b). The same numbers are applied to the sections in FIG. 4 which are the same as the sections in FIGS. 1 and 2.

In FIGS. 4(a) and 4(b), camera-shake compensating device 10 is installed at the bottom by camera main body 2 of digital camera 1. Electrical power is supplied and the various signals are sent to image capturing element 16 through pull-out section 80a of flexible circuit board 80. Pull-out section 80a is folded toward optical axial direction L, at a section which is just beyond second slider 14 in the direction parallel to the long edge of image capturing element 16, and is beyond second slider 14 in the horizontal direction. Further, pull-out section 80a is connected to connector 81a of image capturing board 81.

In the above description, pull-out section 80a of flexible circuit board 80 is pulled out in the direction parallel to the long edge of image capturing element 16. However, it can also be pulled out in the direction parallel to the short edge of image capturing element 16. In any case, in order to structure digital camera 1 to be thinner, pull-out section 80a of flexible circuit board 80 should be pulled out in H-direction or V-direction of image capturing element 16, and first linear actuator 28 and second linear actuator 56 are arranged in the direction different from the pull-out direction of flexible circuit board 80.

Flexible circuit board 80 will be detailed while referring to FIG. 5, which are schematic drawings showing examples of the pull-out directions and the bending shapes of flexible circuit board 80. FIG. 5(a) is a drawing showing that pull-out section 80a of flexible circuit board 80 is placed in the direction of the long edge of image capturing element 16 (being the H-direction). FIG. 5(b) is a drawing showing that pull-out section 80a of flexible circuit board 80 is placed in the direction of the short edge of image capturing element 16 (being the V-direction).

FIG. 5(c) is a drawing showing that pull-out section 80a of flexible circuit board 80 is placed in the direction declined to both the long edge and the short edge of image capturing element 16.

Since flexible circuit board 80 is structured of a very thin plastic material, it can be bent by a relatively small force to its thickness direction (being the direction which is perpendicular to the sheet surface of the figure). However, for bending or twisting in directions except for the above case (that is, for bending or twisting in the direction which is parallel to the sheet surface of the figure, such as in H-direction or V-direction), a very strong force is necessary in comparison with bending or twisting in the thickness direction. Accordingly, when flexible circuit board 80 is bent in optical axial direction L (being in the direction perpendicular to the sheet surface), flexible circuit board 80 must be bent without being twisted, which is a very important matter to reduce the load when image capturing element 16 is moved.

In order not to twist flexible circuit board 80, and to reduce the required space for mounting it, it is preferable that the pull-out direction of flexible circuit board 80 is parallel to the long edge of image capturing element 16 [being the H-direction in FIG. 5(a)], or parallel to the short edge [being the V-direction in FIG. 5(b)]. If flexible circuit board 80 is to be pulled out in any other direction without twisted, flexible circuit board 80 occupies a relatively large space as shown in FIG. 5(c), which projects excessively from the rectangular profile of image capturing element 16, and is not suitable for a thin bodied camera.

For example, as shown in FIG. 4, pull-out section 80a of flexible circuit board 80 is to be bent in optical axial direction L at a section just adjacent to the end of second slider 14, pull-out section 80a can be bent along dashed line 80b in the cases of FIGS. 5(a) and 5(b). However, in the case of FIG. 5(c), since pull-out section 80a can be bent only along dashed line 80b, it is not possible to mount camera-shake compensating device 10 at the bottom of camera main body 2 of digital camera 1.

As described above, flexible circuit board 80 can be bent to its thickness direction by a relatively small force. When the curvature radius of a bent section of flexible circuit board 80 is relatively small, flexible circuit board 80 generates large force, which is not negligible. In some cases, this force transfers most of the load to move image capturing element 16. In conventional camera-shake compensating device 510, as described above, when image capturing element 16 is to be moved in H-direction or V-direction, a single actuator must drive the total load, which is very heavy. To reduce the heavy load, the curvature radius of the bending section of pull-out section 80a of flexible circuit board 80 must be increased. Accordingly, an extraordinarily large space must be provided between flexible circuit board 80 and image capturing board 81. However in camera-shake compensating device 10 of the present invention, since the image capturing element 16 is moved by the combined driving force generated by two linear actuators, a strong driving force can be obtained which is great enough to counter the force generated by bending of pull-out section 80a of flexible circuit board 80. Accordingly, the curvature radius of bent flexible circuit board 80 can be reduced, which allows further down-sizing of camera main body 2.

As described above, based on the present invention, provided is the image capturing device, including driving devices which can move the image capturing element in a plane which is perpendicular to the optical axis of the image capturing optical system, and in the first direction which is angled to both the long edge and the short edge of the outer shape of the image capturing element, as well as in a second direction which differs to the first direction. The camera-shake compensating device, which is downsized due to more effective use of the available space, and which has high speed and stable shake compensating performance due to an increase of driving force, can be attained.

It is to be noted that the above detailed structure and the detailed function of each structure included in the image capturing device, relating to the present invention, can be changed within the scope which does not deviate from the present invention.

What is claimed is:

1. An image capturing device, comprising
a rectangular image capturing element which has long sides and short sides;
an image capturing optical system which forms an image of a subject on the rectangular image capturing element;
a first driving device which moves the rectangular image capturing element in a first direction which is slanted by a predetermined angle from the long side and the short side of an outer shape of the rectangular image capturing element in a plane perpendicular to an optical axis of the image capturing optical system; and
a second driving device which moves the rectangular image capturing element in a second direction which is slanted by a predetermined angle from the long side and the short side of the outer shape of the rectangular image capturing element in the plane perpendicular to the optical axis of the image capturing optical system, but the second direction differs from the first direction,
wherein both an angle between the first direction and the long side of the outer shape of the rectangular image capturing element and an angle between the second direction and the long side of the outer shape of the rectangular image capturing element are equal to or less than an angle between the long side of the outer shape of the image capturing element and a diagonal line of the outer shape of the rectangular image capturing element.

2. The image capturing device in claim 1, wherein the first direction is not orthogonal to the second direction.

3. The image capturing device in claim 1, wherein the first and second driving devices include a guide section which is structured of a driving shaft of an impact actuator or a stepping motor.

4. The image capturing device in claim 3, the guide section is provided at a back side of the rectangular image capturing element.

5. The image capturing device in claim 1, wherein when a camera shake is compensated, the rectangular image capturing element is moved by the first and second devices in a plane perpendicular to an optical axis of the image capturing optical system.

6. An image capturing device, comprising:
a rectangular image capturing element which has long sides and short sides;
an image capturing optical system which forms an image of a subject on the rectangular image capturing element;
a flexible circuit board which is connected to the rectangular image capturing element, and pulled out in a predetermined pull-out direction, and sends electrical signals generated in the rectangular image capturing element;
a first driving device which moves the rectangular image capturing element in a first direction which is slanted by a predetermined angle from the predetermined pull-out direction in a plane perpendicular to an optical axis of the image capturing optical system; and
a second driving device which moves the rectangular image capturing element in a second direction which is slanted by a predetermined angle from the predetermined pull-out direction in a plane perpendicular to an optical axis of the image capturing optical system, but the second direction differs from the first direction,
wherein both an angle between the first direction and the long side of the outer shape of the image capturing element and an angle between the second direction and the long side of the outer shape of the image capturing element are equal to or less than an angle between the long side of the outer shape of the rectangular image capturing element and a diagonal line of the outer shape of the rectangular image capturing element.

7. The image capturing device in claim 6, wherein the first direction is not orthogonal to the second direction.

8. The image capturing device in claim 6, wherein the first and second driving devices include a guide section which is structured of a driving shaft of an impact actuator or a stepping motor.

9. The image capturing device in claim 8, wherein the guide section is provided at a back side of the rectangular image capturing element.

* * * * *